(12) United States Patent
Wronski et al.

(10) Patent No.: US 9,970,634 B1
(45) Date of Patent: May 15, 2018

(54) RECESSED LUMINAIRE FOR REMODEL APPLICATIONS

(71) Applicant: Cooper Technologies Company, Houston, TX (US)

(72) Inventors: Grzegorz Wronski, Peachtree City, GA (US); Zhihong Lin, Shanghai (CN); Steven Pyshos, Peachtree City, GA (US); Oliver Ernst, Peachtree City, GA (US)

(73) Assignee: Cooper Technologies Company, Houston, TX (US)

( * ) Notice: Subject to any disclaimer, the term of this patent is extended or adjusted under 35 U.S.C. 154(b) by 0 days. days.

(21) Appl. No.: 15/587,287

(22) Filed: May 4, 2017

(51) Int. Cl.
| | |
|---|---|
| *F21V 21/04* | (2006.01) |
| *F21V 23/02* | (2006.01) |
| *H02G 3/20* | (2006.01) |
| *F21S 8/02* | (2006.01) |
| *F21V 21/00* | (2006.01) |

(52) U.S. Cl.
CPC ............ *F21V 21/041* (2013.01); *F21S 8/026* (2013.01); *F21V 23/026* (2013.01); *H02G 3/20* (2013.01); *F21V 21/00* (2013.01)

(58) Field of Classification Search
CPC ......... F21V 21/041; F21V 21/00; H02G 3/20; H02G 3/14; H02G 3/081; F21S 8/026
USPC .......................................................... 174/58
See application file for complete search history.

(56) References Cited

U.S. PATENT DOCUMENTS

| | | | |
|---|---|---|---|
| 8,273,998 B2 * | 9/2012 | Drane | H01R 24/78 174/482 |
| 8,575,484 B1 * | 11/2013 | Witherbee | H02G 3/14 174/50 |

* cited by examiner

*Primary Examiner* — Dhirubhai R Patel
(74) *Attorney, Agent, or Firm* — King & Spalding LLP

(57) ABSTRACT

A remodel recessed luminaire includes a housing can that defines a first slope and a junction box that defines a second slope. Further, the housing can includes a channel to retain a thermoprotector therein, the channel being defined by an indentation formed in a top wall of the housing can. The junction box includes a top cover that is coupled to a main body of the junction box and the top wall of the housing can such that the top cover encloses a wire management cavity that is formed by the channel that is communication with a second cavity defined by the main body. Furthermore, the junction box includes a coupling feature to attach an electrical component to the junction box. The first slope and the second slope operate in unison to fit the remodel recessed luminaire through small ceiling apertures and/or ceiling apertures in thick ceilings.

20 Claims, 14 Drawing Sheets

RECESSED LUMINAIRE FOR REMODEL APPLICATIONS

TECHNICAL FIELD

Embodiments of the present disclosure relate generally to lighting systems, and more particularly to a recessed luminaire for remodel applications.

BACKGROUND

Recessed luminaires are widely used in new-construction applications and/or remodel applications because they provide for a wide variety of illumination patterns for various uses while the fixture structure is itself hidden from plain view within a plenum space between a lower finished surface ceiling (herein 'lower ceiling', also interchangeably referred to as 'ceiling') and an upper structural ceiling (herein 'upper ceiling'). In remodel applications where a lower ceiling (e.g., ceiling drywall) is already in place and there is little or no access to support structures (e.g., joists) in the space above the lower ceiling, the recessed luminaires are installed through either pre-existing apertures or newly created apertures in the lower ceiling. Often, the pre-existing apertures may be small (in diameter) or the lower ceiling having the pre-existing or newly formed apertures may be thick (e.g., 1 inch to 2 inches).

Conventional recessed luminaires are not configured for easy installation through such small apertures in the ceiling or through apertures that are formed in a thick ceiling, especially when the plenum space above the ceiling is shallow. Further, recessed luminaires may commonly encounter the problem of excessive heat buildup which can affect the electrical wiring cables or ducts in the plenum space. As a solution, recessed luminaires are provided with thermal protectors or thermoprotector means (herein 'thermoprotectors') that are configured to interrupt an electrical power to a light circuit of the recessed luminaires if the temperature associated with the recessed luminaires exceeds a certain preset value.

In conventional recessed luminaires, said thermoprotectors may be disposed inside or outside the recessed housing can of the recessed luminaire using a thermoprotector casing. The thermoprotector casing may result in additional end user cost. Further, the thermoprotector requires additional wiring to be routed through or disposed in the interior of the recessed housing can which may be undesirable, especially in smaller recessed housing cans designed for installation in tight spaces (e.g., shallow plenum space).

Furthermore, junction boxes of conventional recessed luminaires increase the footprint of the recessed luminaires because the junction boxes are designed to support transformers on an outer surface of the junction boxes in separate transformer enclosures away from the electrical wiring in the junction boxes. This in turn increases the footprint of the conventional recessed luminaires. The larger footprint of the conventional recessed luminaires may be undesirable, especially for installation in tight spaces or applications where access to the plenum space above the ceiling may be limited, e.g., remodel applications.

SUMMARY

In one aspect, the present disclosure can relate to a remodel recessed luminaire that has a housing can which defines a first inner cavity. Further the housing can includes an indentation formed in a top wall of the housing can. The indentation defines a channel that is configured to retain a thermoprotector device therein, and the channel is open on a top and on one side while a remainder of the channel is bounded by the top wall of the housing can. Further, the remodel recessed luminaire includes a junction box that defines a second cavity. The junction box is coupled to the housing can such that the top of the channel that is open is covered by the junction box, and the second cavity is in continuous communication with the channel through the one side of the channel that is open to form a wire management cavity that is disposed external to the first inner cavity of the housing can. When the thermoprotector device is disposed in the channel, electrical wiring from an external power supply source is connected to the thermoprotector device through the wire management cavity that is external to the first inner cavity of the housing can and via an electrical connector disposed in the second cavity defined by the junction box.

In another aspect, the present disclosure can relate to a remodel recessed luminaire that has a housing can which includes a sloped wall that extends between a top wall and a side wall of the housing can. The sloped wall is asymmetric such that the sloped wall is wider on a first side of the housing can than on a second side of the housing can that is opposite to the first side. The wider portion of the sloped wall on the first side defines a first slope. Further, the remodel recessed luminaire includes a junction box that is coupled to the housing can adjacent the second side of the housing can. The junction box includes a main body that defines a complementary second slope that is disposed at a bottom side of the junction box, wherein the complementary second slope tapers towards a front wall of the main body. The junction box is coupled to the housing can such that the front wall of the main body is disposed adjacent the second side of the housing can and a wire receiving opening formed in the side wall on the second side of the housing can is axially aligned with a wire receiving opening in the front wall of the main body. The first slope defined by the sloped wall of the housing can and the complementary second slope defined by the main body of the junction box operate in concert to fit the remodel recessed luminaire through a small ceiling aperture or a ceiling aperture of a thick ceiling.

These and other aspects, objects, features, and embodiments, will be apparent from the following description and the appended claims.

BRIEF DESCRIPTION OF THE FIGURES

The foregoing and other features and aspects of the present disclosure are best understood with reference to the following description of certain example embodiments, when read in conjunction with the accompanying drawings, wherein.

Figure 1:
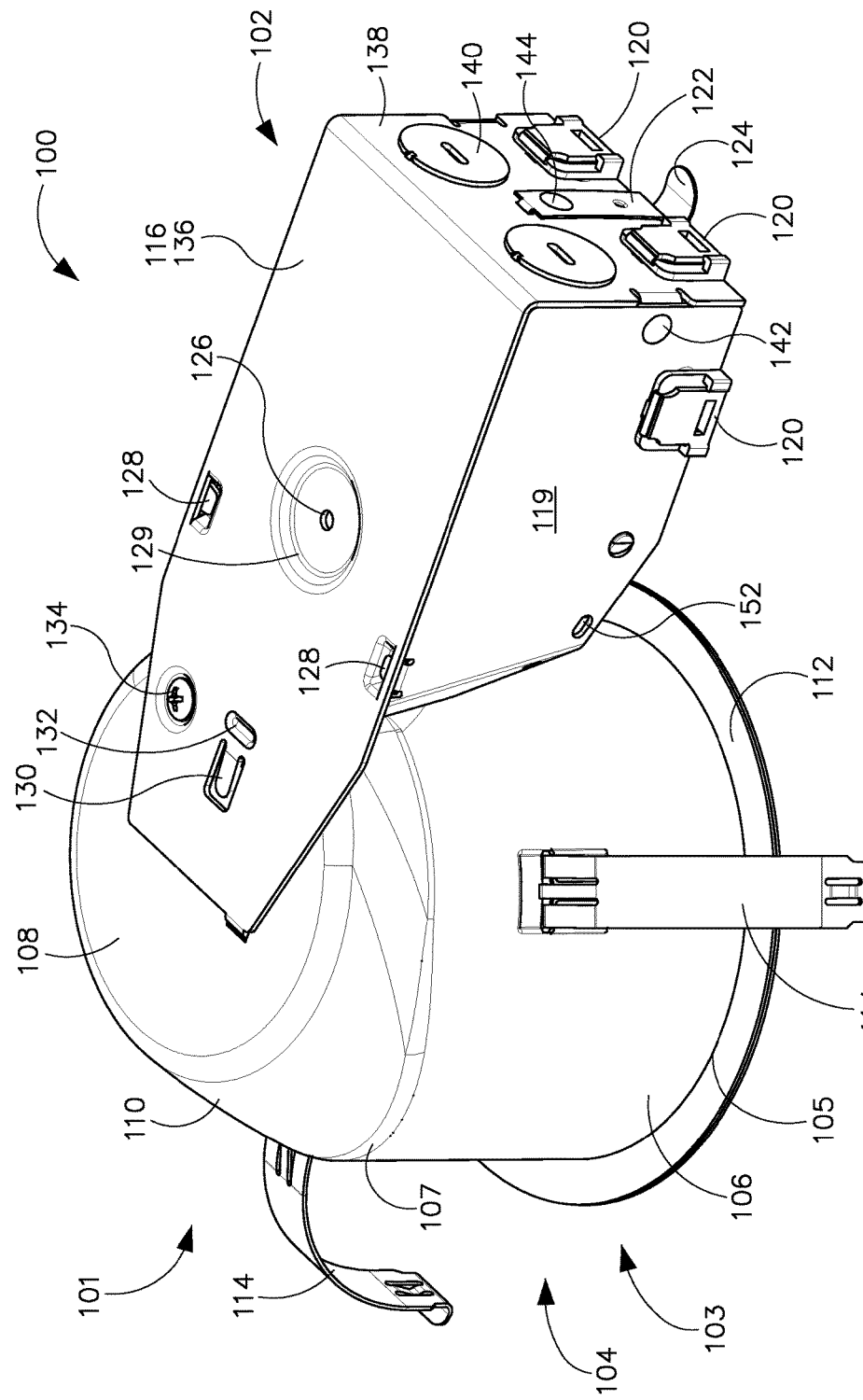
FIG. 1 illustrates a perspective view of an example recessed luminaire for remodel applications, in accordance with example embodiments of the present disclosure.
Figure 2:
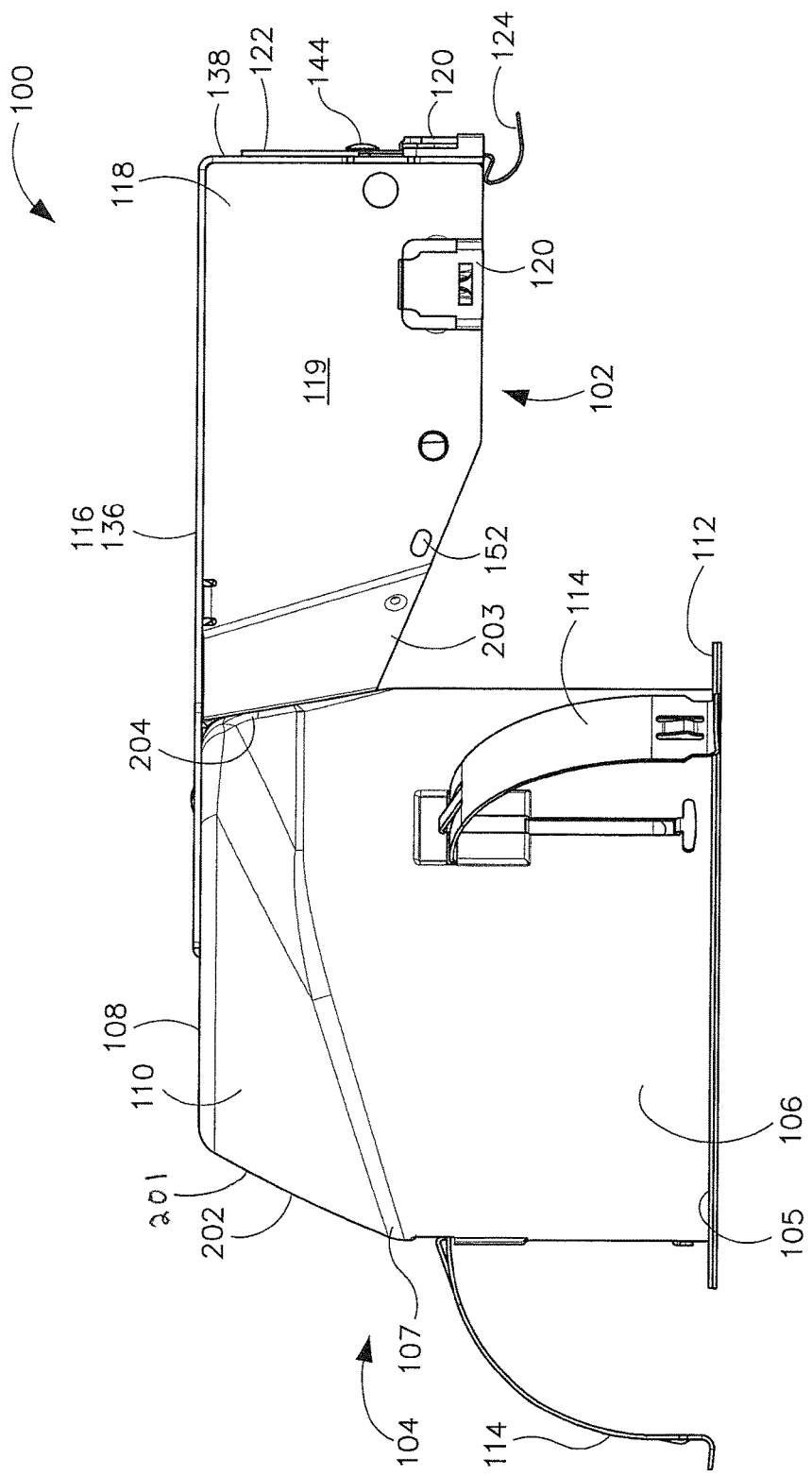
FIG. 2 illustrates a side view of the recessed luminaire of FIG. 1, in accordance with example embodiments of the present disclosure.

The drawings illustrate only example embodiments of the present disclosure and are therefore not to be considered limiting of its scope, as the present disclosure may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles.

DETAILED DESCRIPTION OF EXAMPLE EMBODIMENTS

The present disclosure describes an example recessed luminaire for remodel applications (herein 'remodel recessed luminaire'). The remodel recessed luminaire includes a recessed housing can (herein 'housing can') that defines a first inner cavity and has a sloped wall that extends between a top wall and a side wall of the housing can. The sloped wall is asymmetrically shaped such that the sloped wall is wider at a first side of the housing can than at an opposite second side. The portion of the sloped wall that is wider at the first side defines a first slope. Further, the remodel recessed luminaire includes a junction box that defines a second inner cavity and defines a complementary slope. The junction box is coupled to the second side of the housing can. The first slope defined by the housing can and the complementary second slope defined by the junction box operate in unison to allow the remodel recessed luminaire to fit through small ceiling apertures and through ceiling apertures in thick ceilings for remodel applications. The shape, size, and/or angle of the first slope and the complementary second slope may be configured depending on the diameter of the ceiling aperture through which the remodel recessed luminaire is to be fitted and the thickness of the ceiling that is to be cleared by the remodel recessed luminaire.

Further, the remodel recessed luminaire includes an indentation that is formed in the top wall of the housing can. The indentation defines a channel to accommodate a thermoprotector therein. The channel is open on the top and on one side, while a remainder of the channel is bounded by an outer surface of the top wall of the housing can. The opening on the one side of the channel connects the channel to the second inner cavity defined by the junction box such that they are in continuous communication and define a continuous wire receiving cavity.

In particular, the junction box includes a main body that defines the second inner cavity (herein 'second cavity'), a portion of which is open. The junction box also includes a top cover that is coupled to the main body such that a portion of the top cover covers the portion of the second inner cavity that is open. A remaining portion of the top cover overhangs or juts from the main body. The remaining portion of the top cover is coupled to the top wall of the housing can to attach the junction box to the housing can. In particular, the remaining portion of the top cover is coupled to the top wall of the housing can such that: (a) the top cover covers the opening on the top of the channel. In other words, the top cover covers the open top portion of the channel and the open portion of the second cavity such that it encloses the continuous wire receiving cavity that is formed by the channel and the second cavity that are in continuous communication. Further, when the top cover is coupled to the housing can, a tab and a rib of the top cover are disposed above the channel. When the thermoprotector is disposed in the channel and the top cover is coupled to the top wall of the housing can, the tab and the rib of the top cover engage and securely retain the thermoprotector to enhance a thermal contact or coupling of the thermoprotector with the outer surface of the housing can.

The second cavity defined by the junction box is configured to house an electrical component, such as a transformer therein. In particular, the electrical component is coupled to the top cover using a fastener. Accordingly, the top cover of the junction box includes a coupling feature, e.g., an aperture, that is configured to receive the fastener therethrough to attach the electrical component to the top cover.

Disposing the thermoprotector within the channel that is: (a) formed on the outer surface of the housing can (external to the first inner cavity defined by the housing can), (b) in continuous communication with the second inner cavity of the junction box, and (c) covered by the top cover, eliminates the need to route wiring between the thermoprotector and the junction box through the interior, e.g., the first inner cavity, of the housing can. This in turn reduces the number of wires entering and disposed in the first inner cavity of the housing can. Also, securely retaining the thermocouple in the channel using the tab and rib feature of the top cover eliminates the need for a thermoprotector casing.

Example embodiments of a remodel recessed luminaire will be described more fully hereinafter with reference to the accompanying drawings, in which example embodiments of remodel recessed luminaires are shown. Remodel recessed luminaires may, however, be embodied in many different forms and should not be construed as limited to the example embodiments set forth herein. Rather, these example embodiments are provided so that this disclosure will be thorough and complete, and will fully convey the scope of remodel recessed luminaires to those of ordinary skill in the art. Like, but not necessarily the same, elements (also sometimes called components) in the various figures are denoted by like reference numerals for consistency. Terms such as "first," "second," "top," "base," "open," and "closed" are used merely to distinguish one component (or part of a component or state of a component) from another. Such terms are not meant to denote a preference or a particular orientation.

Moving now to discuss the figures, FIGS. 1-14 will describe one or more example embodiments of a remodel recessed luminaire. Referring to FIGS. 1-14, an example remodel recessed luminaire 100 may include a housing can 104 and a junction box 102 that is coupled to the housing can 104.

i. Housing Can

In certain example embodiments, the housing can 104 may include a bottom portion 103 and a top portion 101. The bottom portion 103 may include a substantially cylindrical side wall 106 that extends from a top edge 107 to a bottom edge 105, and a trim flange 112 that extends radially outward and substantially perpendicular to the side wall 106 from the bottom edge 105 of the side wall 106.

The top portion 101 of the housing can 104 may include a substantially circular top wall 108 that has a smaller diameter than the side wall 106, and a sloped wall 110 that is disposed in between the top wall 108 and the side wall 106. The sloped wall 110 may extend from the perimeter of the top wall 108 to the top edge 107 of the side wall 106. In particular, the sloped wall 110 may be asymmetric in that the width of the sloped wall 110 (measured from the top wall 108 to the side wall 106) may be larger on a first side 202 of the housing can 104 than an opposite second side 204 of the housing can 104. In addition to the width of the sloped wall 110, in some example embodiments, the slope angle of the sloped wall may also vary from the first side 202 to the second side 204.

The wider portion of the sloped wall 110, i.e., the sloped wall 110 at the first side 202 of the housing can 104, may define a first slope 201 which may operate in unison with a complementary second slope 203 (shown in FIG. 2 and described below in greater detail in association with the junction box 102) to fit the remodel recessed luminaire 100 through small ceiling apertures 1004 and through ceiling apertures in thick ceilings 1002. It is noted that the shape, size (e.g., width), and/or angle of the first slope 201 and the complementary second slope 203 may be defined or configured depending on the diameter of the ceiling aperture 1004 through which the remodel recessed luminaire 100 is to be fitted and/or the thickness 1006 of the ceiling 1002 that is to be cleared by the remodel recessed luminaire 100.

Further, the top portion 101 of the housing can 104 may include an indentation 315 (shown in FIG. 8) formed in the top wall 108. The indentation 315 may define a channel 316 (shown in FIGS. 3, 5, and 8) on the outer surface of the top wall 108. The channel 316 may extend from substantially the center of the top wall 108 to the outer perimeter of the top wall 108. In certain example embodiments, the channel 316 may extend towards the second side 202 or any appropriate direction in which the junction box 102 is coupled to the housing can 104. The channel 316 may be open on the top and on one side 817 (shown in FIG. 8), and may be bounded on all other sides by the top wall 108. In particular, the channel 316 may be configured to house a thermoprotector 320 therein. Even though the figures illustrate that channel as having a substantially rectangular shape, one of ordinary skill in the art can understand and appreciate that in other example embodiments, the channel may have any other appropriate geometric or non-geometric shape without departing from a broader scope of the present disclosure.

Furthermore, the top portion 101 of the housing can 104 may include one or more coupling features, such as a cover slot 318 and a cover aperture 314 that extends through the top wall 108. The cover slot 318 and the cover aperture 314 may be configured to engage complementary coupling features of a junction box to couple the junction box 102 to the housing can 104. In certain example embodiments, the cover slot 318 and the cover aperture 314 may be formed on opposite sides of the channel 316. However, in other example embodiments, the cover slot 318 and the cover aperture 314 may be formed at any other appropriate portion of the top wall 108 without departing from a broader scope of the present disclosure.

Additionally, the housing can 104 may include a wire receiving opening 395 (shown in FIG. 5) that is disposed on the side wall 116 and adjacent the channel 316 on the second side 204. The wire receiving opening 395 may be a through opening that is configured to pass electrical wiring therethrough, the electrical wiring being associated with a light circuit 402 (shown in FIG. 4), such as a light socket, LED light source, etc., that is disposed in the first inner cavity 410 defined by the housing can 104.

The remodel recessed luminaire 100 may also include one or more retention spring clips 114 that are coupled to and extend through the side wall 106 of the housing can 104. The retention clips 114 may be configured to retain or hold the remodel recessed luminaire 100 in the ceiling aperture 1004 by clamping the ceiling 1002 between the trim flange 112 of the housing can 104 and the feet of the retention spring clips 114.

ii. Junction Box

In certain example embodiments, the junction box 102 of the remodel recessed luminaire 100 may include a top cover 116 and a main body 118 that is coupled to the top cover 106 to define and enclose a second cavity 391.

The top cover 116 may include a first wall 136 and a second wall 138 that extends substantially perpendicular to the first wall 136 from a short edge of the first wall 136. The first wall 136 may be longer than the second wall 138. In particular, the first wall 136 of the top cover 116 may include a coupling tab 304 that is disposed at and extends out from a short edge of the first wall 136 which is opposite to the second wall 138. Further, the first wall 136 may include a coupling aperture 302 extending through the first wall 136. The coupling aperture 302 on the top cover 116 may be configured to receive a fastener 134, such as a threaded screw, therethrough, to couple the top cover 116 of the junction box 102 to the housing can 104. Furthermore, the first wall 136 may include a mounting pad 129 with a fastening aperture 126 disposed therein to attach an electronic component 802, such as a transformer, to the top cover 116. Additionally, the first wall 136 may include a pair of receiving tabs 128, each receiving tab 128 extending down from a bottom surface 710 of the first wall 136 and defining a blind slot 702. The first wall 136 also includes a securing tab 130 and a securing rib 132 disposed adjacent the securing tab 130. The securing tab 130 may extend down at an acute angle and away from the top surface 713 of the top wall 136.

The second wall 138 of the top cover 116 may include one or more knockouts 140 that can be detached from the second wall 138 using appropriate tools or by applying manual pressure to create openings that are configured to receive one or more conductors therethrough. Further, the second wall 138 may include one or more notches 704 that are formed at a bottom edge (edge that is away from the first wall 136) of the second wall 138. The notches 704 may be configured to receive and/or retain wire traps 120 therein. The wire traps 120 may be coupled (e.g., fixedly, slidably, removably) to the notches 704 in the second wall 138 in any suitable manner. Each wire trap 120 can be used to pass an electrical wiring cable 310 therethrough, where the electrical wiring cable 310 can include a single electrical conductor or multiple electrical conductors (602, 606, 612). Further, each wire trap 120 may include a base and a cap that may be hingedly coupled to each other. Typically, the cap of the wire trap 120 may remain in a closed position. However, when the electrical wiring cable 310 is to be inserted into the junction box 102, the cap 123 may be opened to expose an opening in the base 121 and pass an electrical wiring cable 310 therethrough, as shown by wire trap 120a. In the example embodiment illustrated in FIGS. 4, 6, and 9, the electrical wiring cable 310 may be a power supply wiring that is coupled to an electrical power source at one end and may comprise a live wire 606, a neutral wire 602, and a ground wire 612.

The second wall 138 may further include a fastening device aperture 706 that is configured to receive a fastener 144, such as a rivet or a screw, therethrough to couple a fastening device 122 having a fastening feature 124 to the top cover 116. The fastening feature 124 may be a spring clip or any other appropriate fastener. Additionally, the second wall 138 of the top cover 116 may include a pair of fastening tabs 324 disposed on opposite short edges of the second wall 138, where each fastening tab 324 includes a through aperture 705 that is configured to receive a fastener 142, such as a rivet or a screw, therethrough to couple a main body 118 of the junction box 102 to the top cover 116.

In certain example embodiments, as illustrated in FIGS. 1, 3, 4, 6, and 8-14, the main body 118 may include two side walls 119, a front wall 379 disposed between the short edges at a front end of the two side walls 119, and a bottom wall 377 disposed adjacent the front wall 379 and between the long edges at a bottom end of the two side wall 119. The side walls 119, the front wall 379, and the bottom wall 377 may be configured and arranged such that they define the second cavity 391. Further, a top side and a rear side (opposite from the front wall 379) of the main body 118 may be open. Furthermore, the bottom wall 377 of the main body 118 may define a notch 394 that provides access to the second cavity 391 from a bottom side (opposite to the open top side) of the main body 118. The notch 394 defined by the bottom wall 377 may be covered by a door 306 which is hingedly coupled to the main body 118 by inserting hinge protrusions 413 extending from an edge of the door 306 through corresponding hinge receiving apertures 152 on the side walls 119 of the main body 118. To cover the notch 391, the door 306 may be retained in a closed position by fastening the door 306 using the fastening feature 124 of the fastening device 122 on the top cover 116. When the fastening feature 124 is released, the door 306 swings away from the main body 118 to open and provide access to the second cavity 391.

Further, as illustrated in FIGS. 1, 3, 4, 6, and 8-14, at least a portion of each side wall 119, for example, a portion of the long edge at the bottom end of the side wall 119, may be tapered towards the front wall 379. The tapered portion of the side walls 119 may define a complementary second slope 203 that may operate in unison with the first slope 201 of the housing can 104 to fit the remodel recessed luminaire 100 through small ceiling apertures 1004 and through ceiling apertures in thick ceilings 1002. The mounting of the remodel recessed luminaire 100 will be described in greater detail in association with FIGS. 10-14.

Furthermore, each side wall 119 of the main body 118 may include a locking tab 351 that is disposed adjacent a front wall 379 of the main body 118 and that extends substantially perpendicular to the side wall 119 from a portion of a long edge at the top end of the side wall 119. Additionally, each side wall 119 may include a locking aperture 323 disposed adjacent the rear end of the main body 118. The locking tabs 351 and the locking apertures 323 may be configured to couple and lock the main body 118 to the top cover 116 as will be described below in greater detail.

iii. Assembly

In certain example embodiments, the top cover 116 of the junction box 102 may be coupled to the main body 118 of the junction box 102. In particular, to couple the top cover 116 to the main body 118, the locking tabs 351 of the main body 118 may be engaged with respective blind slots 702 defined by the receiving tabs 128 of the top cover 116 such that: (a) a portion of the first wall 136 of the top cover 116 covers the open top side of the main body 118 and the second wall 138 of the top cover 116 covers the open rear side of the main body 118, (b) a remainder portion of the first wall 136 overhangs from the top side of the main body 118, and (c) the apertures 705 on the fastening tabs 324 of the top cover 116 axially aligns with the corresponding locking apertures 323 on the side walls 119 of the main body 118. Further, a fastener 142 may be passed through each axially aligned aperture pair (705, 323) of the top cover 116 and the main body 118. It is noted that the second cavity 391 may be enclosed when the top cover 116 is coupled to the main body 118 of the junction box 102.

Then, the junction box 102 may be coupled to the housing can 104 by attaching the top cover 116 of the junction box 102 to the housing can 104. In particular, to couple the junction box 102 to the housing can 104, the overhanging portion of the first wall 136 may be disposed on the top wall 108 of the housing can 104 such that: (a) the coupling tab 304 of the top cover 116 engages the corresponding coupling slot 318 on the top wall 108 of the housing can 104, (b) the coupling aperture 302 of the top cover 116 is axially aligned with the cover aperture 314 on the top wall 108 of the housing can 108, (c) the channel 316 formed in the top wall 108 of the housing can 104 is covered by overhanging portion of the first wall 136, (d) the securing tab 130 and the securing rib 132 of the first wall 136 is disposed above the channel 316 formed in the top wall 108 of the housing can 104, and (e) a can receiving opening 393 formed in the front wall 379 of the junction box 102 is axially aligned with the can receiving opening 395 of the housing can 104. Responsively, a fastener 134, such as a threaded screw, may be passed through the axially aligned apertures 302 and 304 of the top cover 116 and the housing can 104.

In particular, the junction box 102 may be coupled to the housing can 104 at a second side 204 of the housing can 104, i.e., opposite to the widest portion of the sloped wall 110 in the housing can 104 such that the complementary second slope 203 defined by the junction box 102 is disposed adjacent the second side 204 of the housing can 104. Furthermore, the junction box 102 in combination with the housing can 104 may enclose the continuous wire management cavity 399 (shown in FIG. 3, and herein 'wire management cavity 399') defined by and including the second cavity 391 and the channel 316 that are in continuous communication.

It is noted that when the thermoprotector 320 is disposed in the channel 316 formed in the top wall 108 of the housing can 104, the securing tab 130 and the securing rib 132 of the top cover 116 that are disposed above the channel 316 may push against the thermoprotector 320 and position the thermoprotector 320 within the channel 316 such that: (a) the thermoprotector 320 is securely retained in the channel 316, and (b) the thermoprotector 320 has good thermal contact/coupling with the top wall 108 of the housing can 104.

iv. Wire Management

Figure 6:
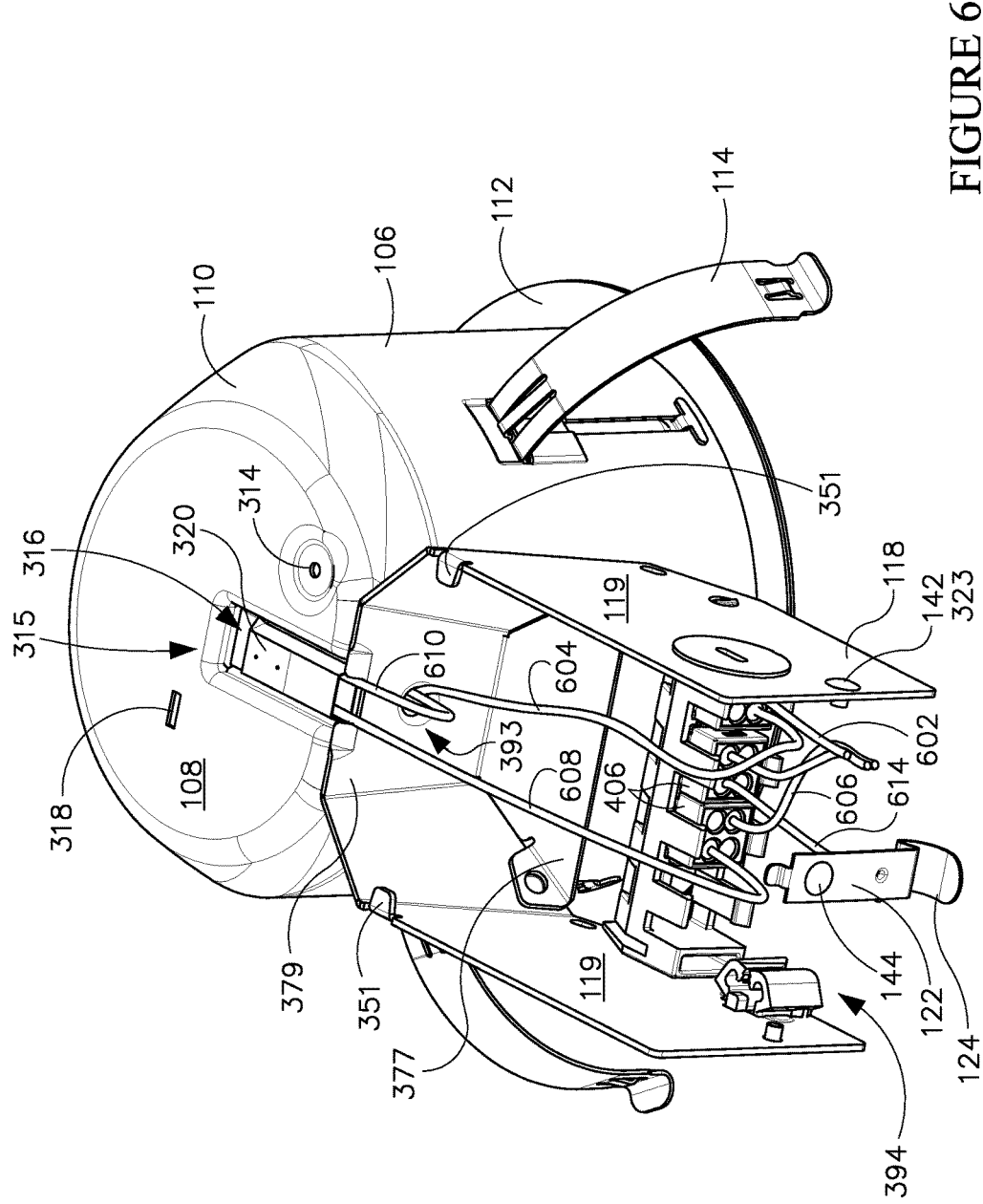
FIG. 6 illustrates another perspective view of the recessed luminaire of FIG. 1 without a door and a top cover of a junction box associated with the recessed luminaire, in accordance with example embodiments of the present disclosure.
Figure 7:
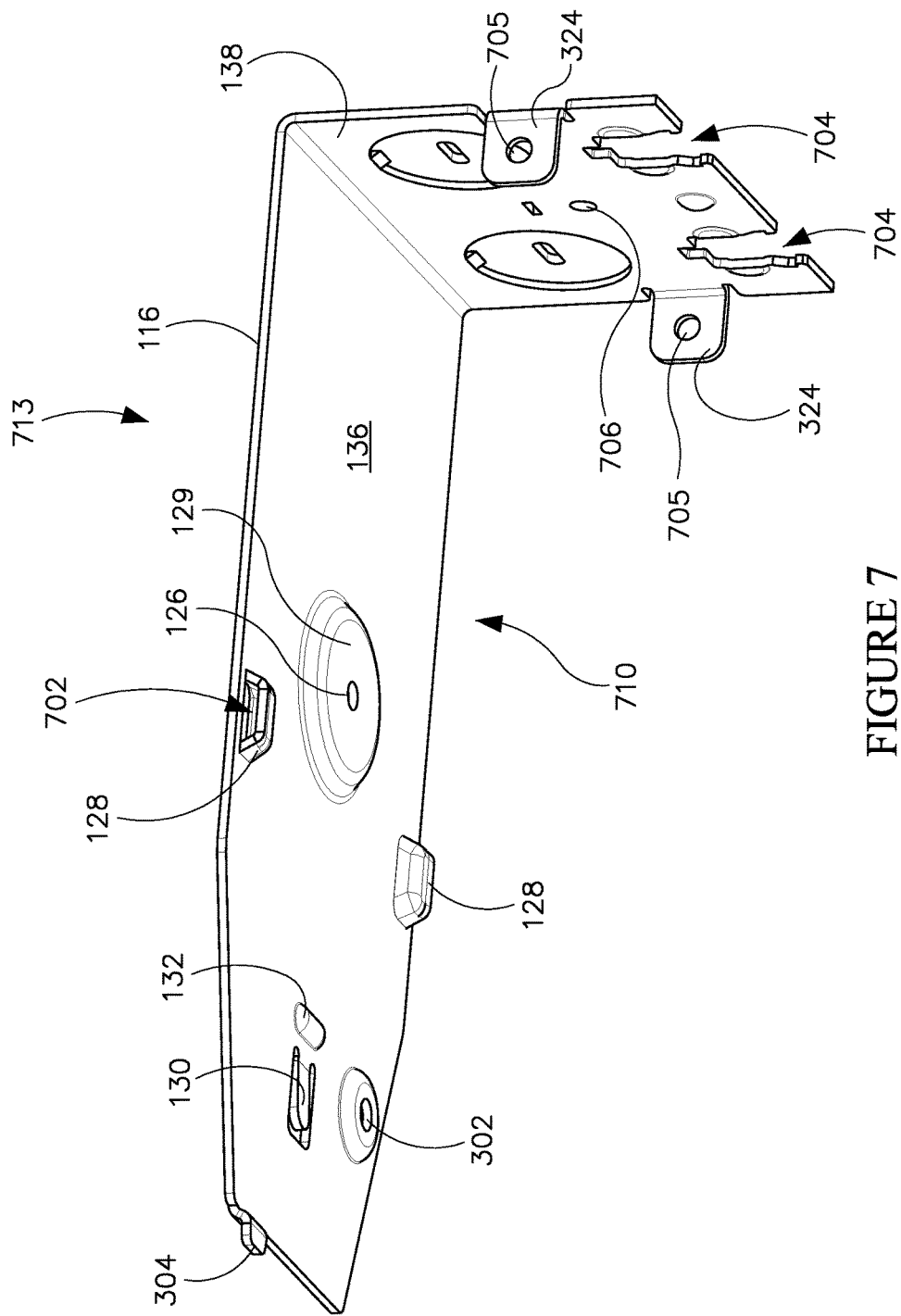
FIG. 7 illustrates a perspective view of the top cover of the junction box, in accordance with example embodiments of the present disclosure.
Figure 9:
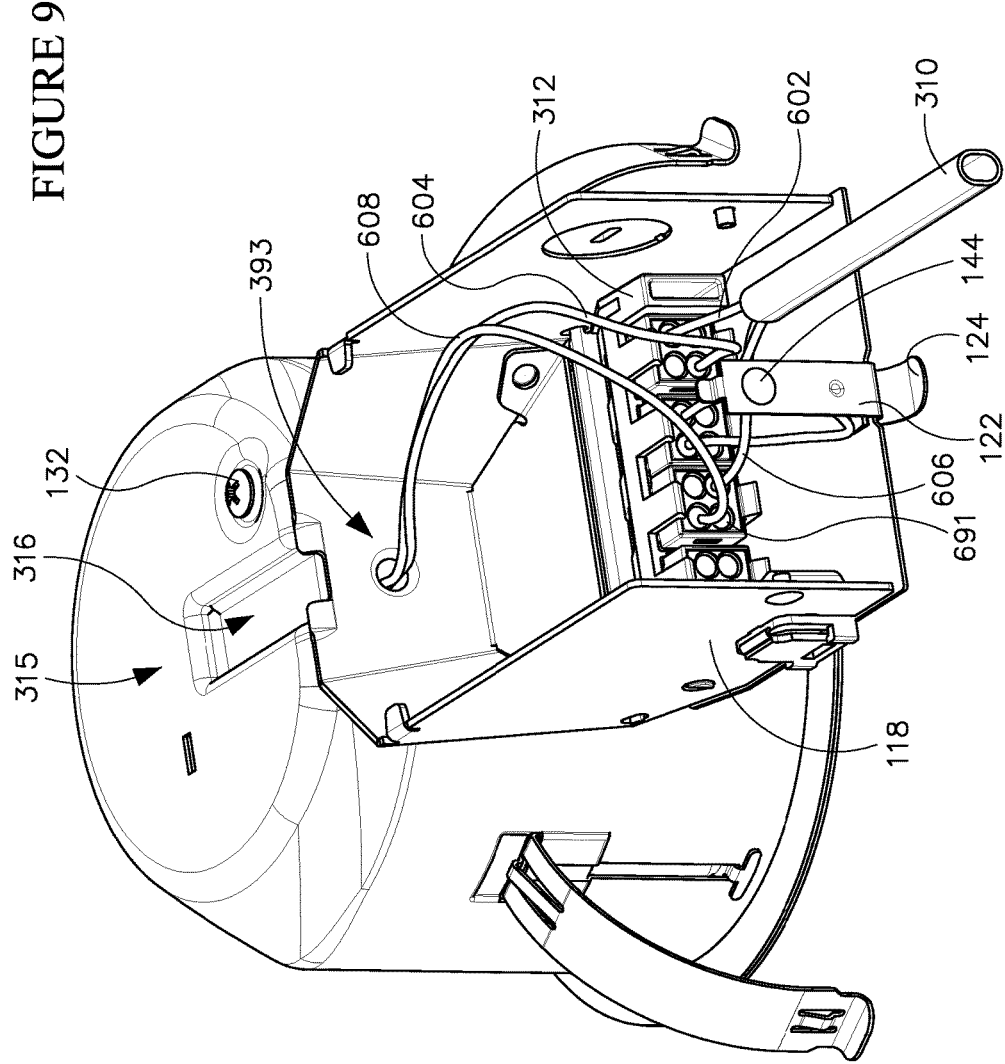
FIG. 9 illustrates another perspective view of the recessed luminaire of FIG. 8 without a top cover, the electrical component attached to the top cover of athe junction box, in accordance with example embodiments of the present disclosure.
Figure 10:
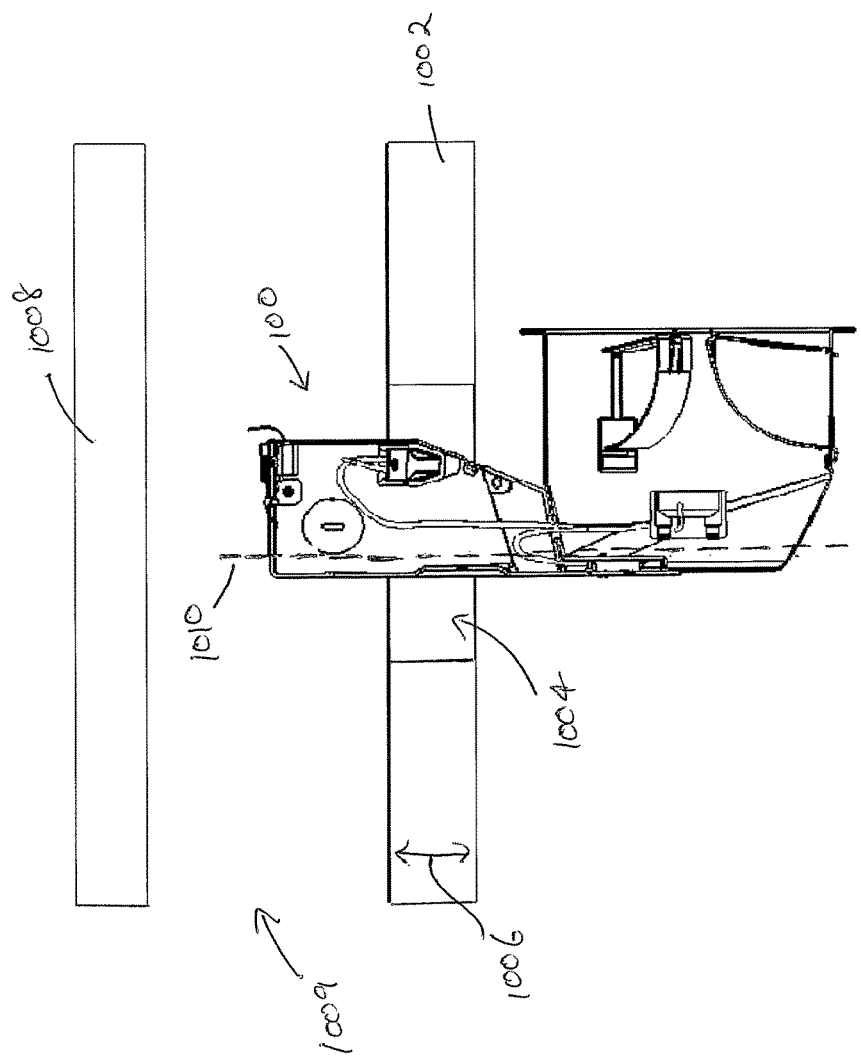
FIGS. 10-14 illustrate an installation of the recessed luminaire of FIG. 1 in a ceiling for a remodel application, in accordance with example embodiments of the present disclosure.

In certain example embodiments, the second cavity 391 defined by the junction box 104 may be configured to house a connector frame 312 that is coupled to the side walls 119 of the junction box 102. The connector frame 312 may support one or more electrical connectors 406 for wire management associated with the remodel recessed luminaire 100. For example, as illustrated in FIGS. 6 and 9, the connector frame 312 may support at least three electrical connectors 406.

Figure 3:
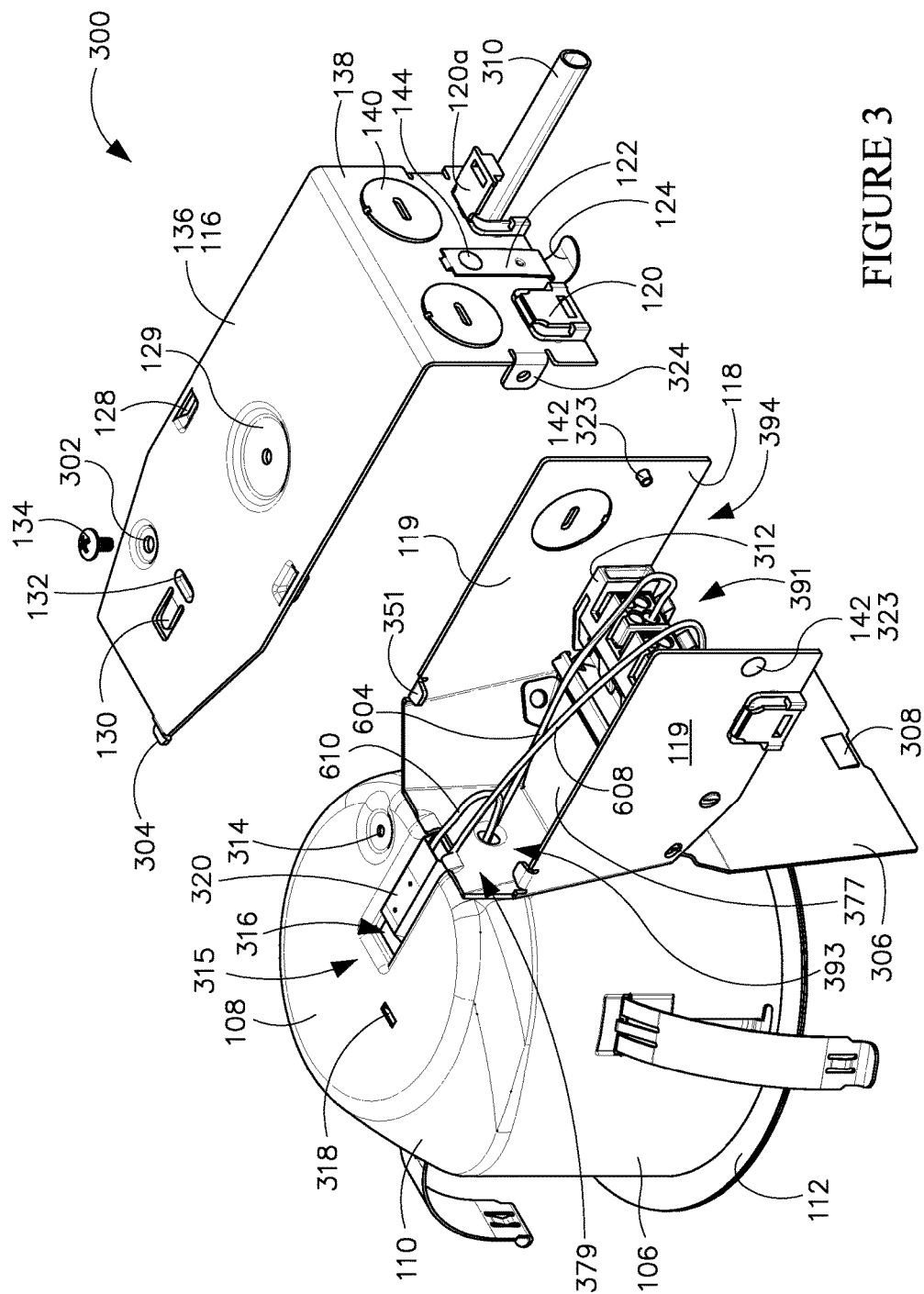
FIG. 3 illustrates an exploded view of the recessed luminaire of FIG. 1, in accordance with example embodiments of the present disclosure.
Figure 4:
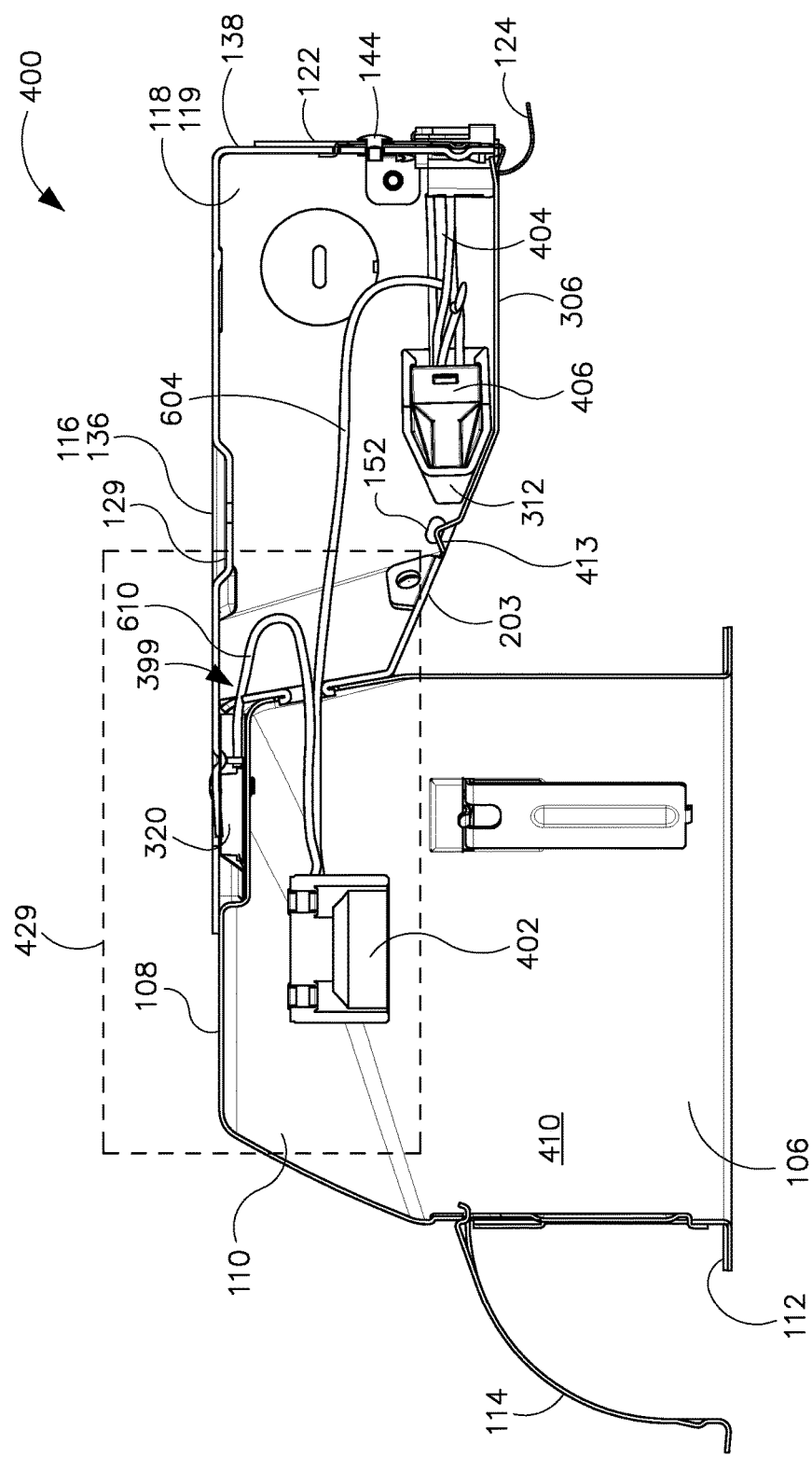
FIG. 4 illustrates a cross-section view of the recessed luminaire of FIG. 1, in accordance with example embodiments of the present disclosure.
Figure 5:
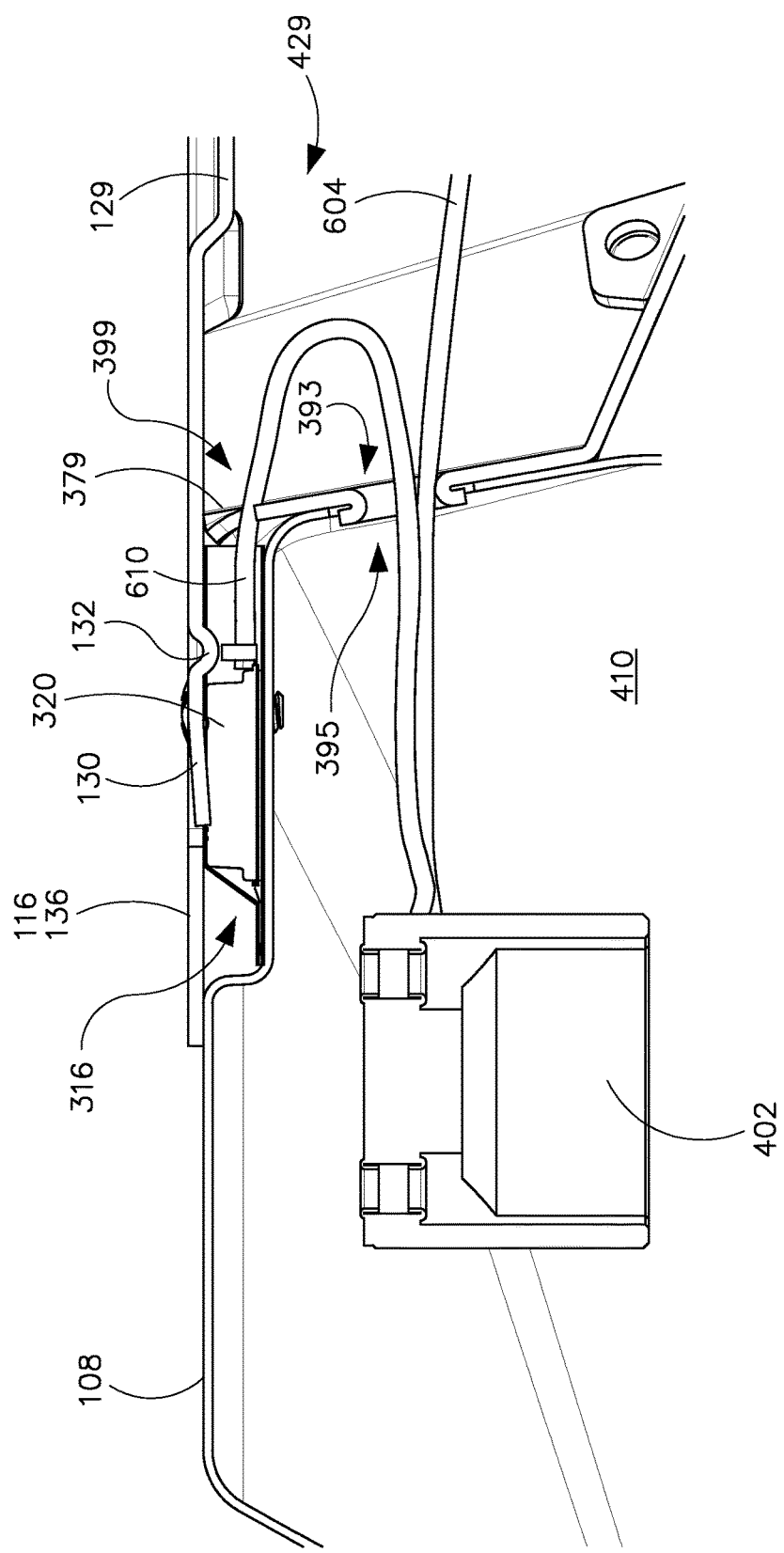
FIG. 5 illustrates an enlarged cross-section view of a portion of the recessed luminaire of FIG. 1, in accordance with example embodiments of the present disclosure.
Figure 8:
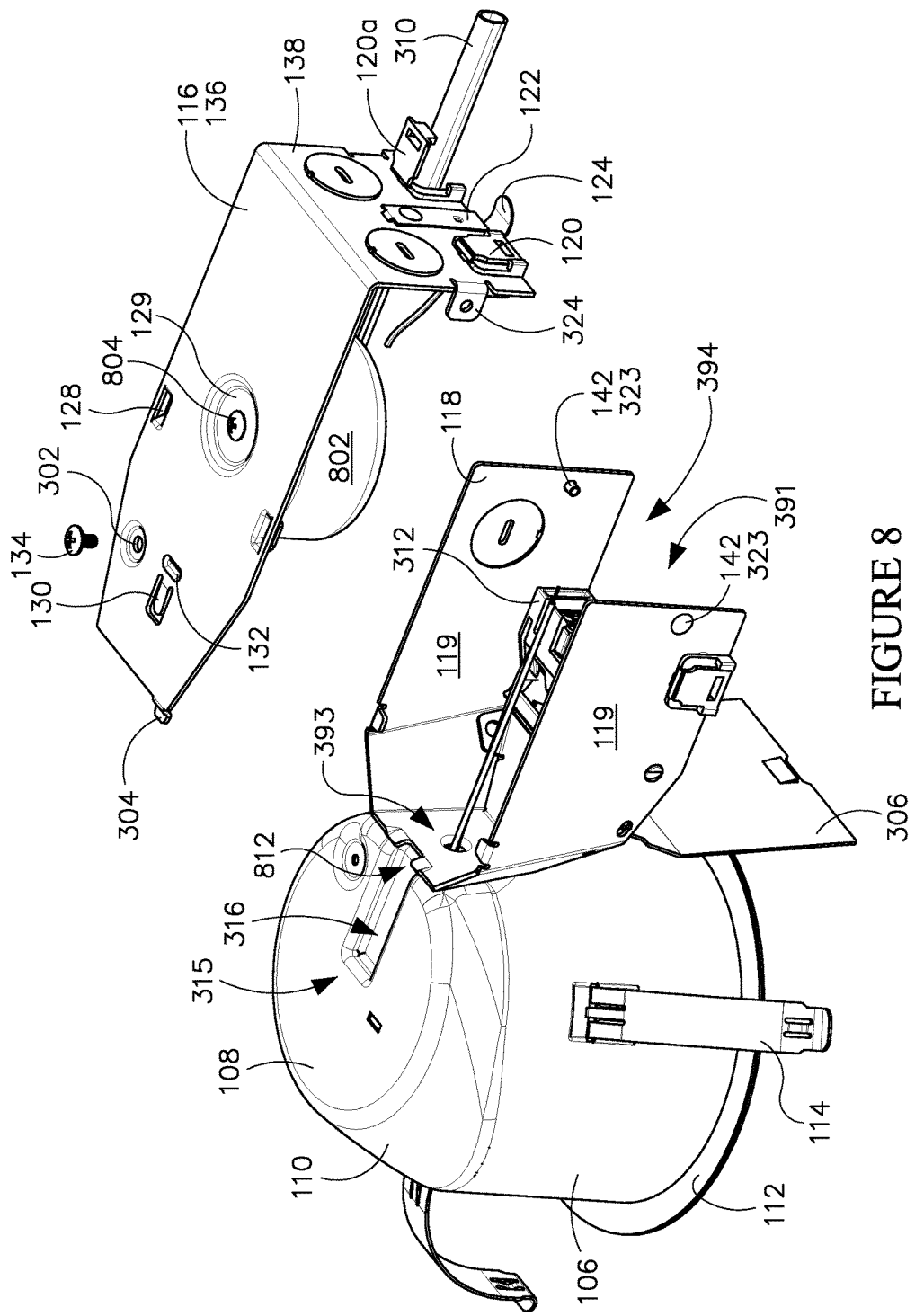
FIG. 8 illustrates a perspective view of the example recessed luminaire of FIG. 1 with an electrical component attached to the top cover of the recessed luminaire, in accordance with example embodiments of the present disclosure.

As illustrated in as illustrated in FIGS. 3, 4, and 8, an electrical wiring cable 310 coupled to a power supply source may be inserted into the second cavity 391 defined by the junction box 102 through the open wire trap 120a. In one example embodiment where the thermoprotector 320 is disposed in the channel 316, a first neutral wire 602 (shown in FIG. 6) carried by the electrical wiring cable 310 may be coupled to a first electrical connector at one end and a power supply source at an opposite end. A second neutral wire 604 that is connected to a neutral terminal of a light circuit 402 (e.g., socket) at one end may also be connected to the first electrical connector at the opposite end of the second neutral wire 604. The first electrical connector may internally connect the first neutral wire 602 to the second neutral wire 604. The second neutral wire 604 may be routed from the electrical connector in second cavity 391 of the junction box 102 to the light circuit 402 disposed in the first inner cavity 410 of the housing can 104 through the axially aligned can receiving openings (395, 393) of the housing can 104 and the junction box 104.

Further, a first live wire 606 (shown in FIG. 6) carried by the electrical wiring cable 310 may be coupled to a second electrical connector at one end and the power supply source at an opposite end. A second live wire 608 that is connected to a thermoprotector 320 disposed in the channel 316 at one end may also be connected to the second electrical connector at the opposite end of the second live wire 608. The second electrical connector may internally connect the first live wire 606 to the second live wire 608. Additionally, a third live wire 610 that is connected to a live terminal of the light circuit 402, e.g., socket, at one end may be coupled to the thermocouple 320 at the opposite end of the third live wire 610 such that the thermocouple 320 is electrically connected in series with the light circuit 402. The third live wire 610 may be routed from the thermoprotector disposed in the channel 316 formed outside and on top of the housing can 104 to the light circuit disposed in the first inner cavity 410 of the housing can 104 through the axially aligned can receiving openings (395, 393) of the housing can 104 and the junction box 104.

Furthermore, a first ground wire 612 (shown in FIG. 6) carried by the electrical wiring cable 310 may be coupled to a third electrical connector at one end and a power supply source at an opposite end. A second ground wire 614 from the third electrical connector may be coupled to portion of the junction box 104 (e.g., the top cover 116 or the fastening device 122) to electrically ground the remodel recessed luminaire 100. The third electrical connector may internally connect the first ground wire 612 to the second ground wire 614.

It is noted that the second live wire 608 may be routed from the second electrical connector in second cavity 391 of the junction box 102 to the channel 316 (in which the thermoprotector is disposed) through the wire management cavity 399 that is external to the first inner cavity 410 defined by the housing can 104. That is, wiring from the junction box 104 to the thermoprotector 320 does not have to be routed through the first inner cavity 410 of the housing can 104, thereby reducing a number of wires in the first inner cavity 410 of the housing can 104. In contrast, in conventional recessed luminaires, wiring from the junction box 104 to the thermoprotector 320 is routed through the first inner cavity 410 of the housing can 104 which increases the number of wires in the first inner cavity 410 of the housing can 104.

In an alternative example embodiment illustrated in FIG. 8 where an electrical component 802 that has an inbuilt thermoprotector functionality, such as a transformer, is used, the electrical wiring may be substantially similar to that in FIG. 6 except that: (a) the second live wire 608 from the second electrical connector may be connected to the live terminal of the light circuit instead of being coupled to the thermoprotector 320, and (b) the third live wire may be eliminated. Additionally, in said alternative example embodiment, the electrical component 802 may be: (a) attached to the mounting pad 129 of the top cover 116 using a fastener 804, and (b) disposed in the second cavity 391 of the junction box 102.

In either case, i.e., with the thermoprotector 320 or the transformer 802, the remodel recessed luminaire of the present disclosure has only two wires that enter and are disposed in the first inner cavity 410 of the housing can 104, e.g., the third live wire 610 from the thermoprotector 320 to the light circuit and the second neutral wire 604 from the electrical connector 406 to the light circuit, or the second live wire 608 and the second neutral wire 604 from the respective electrical connectors 406 to the light circuit.

Even though the present disclosure describes using either the thermoprotector or the transformer with the remodel recessed luminaire at a given instance, one of ordinary skill in the art can understand and appreciate that in some example embodiments, the remodel recessed luminaire may include and use both the thermoprotector and the transformer at the given instance.

v. Mounting the Remodel Recessed Luminaire

In certain example embodiments, the remodel recessed luminaire 100 may be mounted in a pre-existing ceiling aperture 1004 that is small or in newly cut ceiling aperture in a thicker ceiling 1002, e.g., having a thickness 1006 ranging from 1 inch to 2 inch. It is noted that the remodel recessed luminaire 100 of the present disclosure may also be mounted through ceiling apertures in thinner ceilings, e.g., for example, ¼ inch to 1 inch. In other words, the remodel recessed luminaire 100 of the present disclosure may be configured to be mounted through ceiling apertures of ceilings having thickness ranging from ¼ inch to 2 inch.

In one example, to install the remodel recessed luminaire 100 in the plenum space 1009 through either a newly cut or pre-existing ceiling aperture 1004, initially, the electrical wiring cable 310 disposed in the plenum space 1009 may be pulled down towards a floor through the ceiling aperture 1004. Then, the electrical wiring cable 310 may be inserted into the second cavity 391 defined by the junction box 104 through the open wire trap 120a as illustrated in FIGS. 3 and 4. Once the electrical wiring cable 310 is inserted into the second cavity 391, electrical wiring connections may be made as described above and as illustrated in FIG. 6 or 8 depending on whether a thermoprotector 320 or an electrical component 802 having thermoprotector functionality is used with the remodel recessed luminaire 100. The electrical wiring connections may be made by accessing the second cavity 391 from the bottom side by opening the door 306. Once the electrical wiring connections are made, the door 306 may be closed using the fastening feature 124 of the fastening device 124 that is coupled to the top cover 116.

Figure 11:
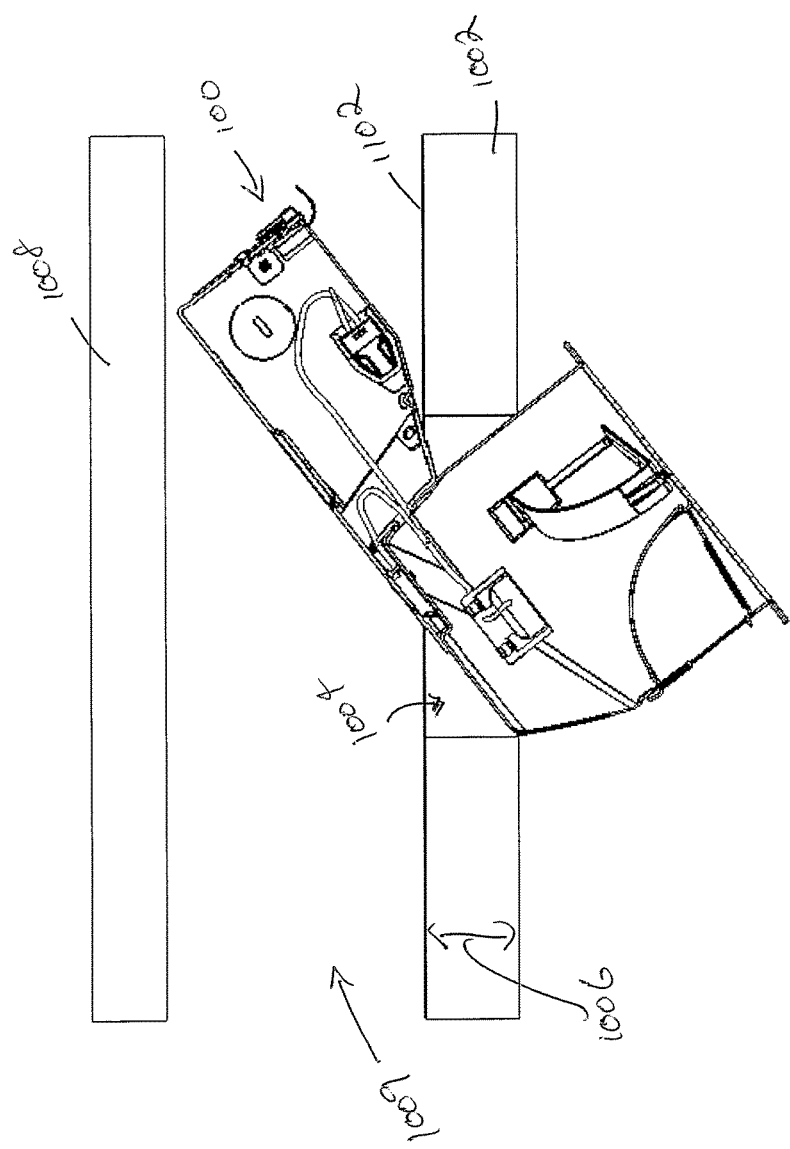
Figure 12:
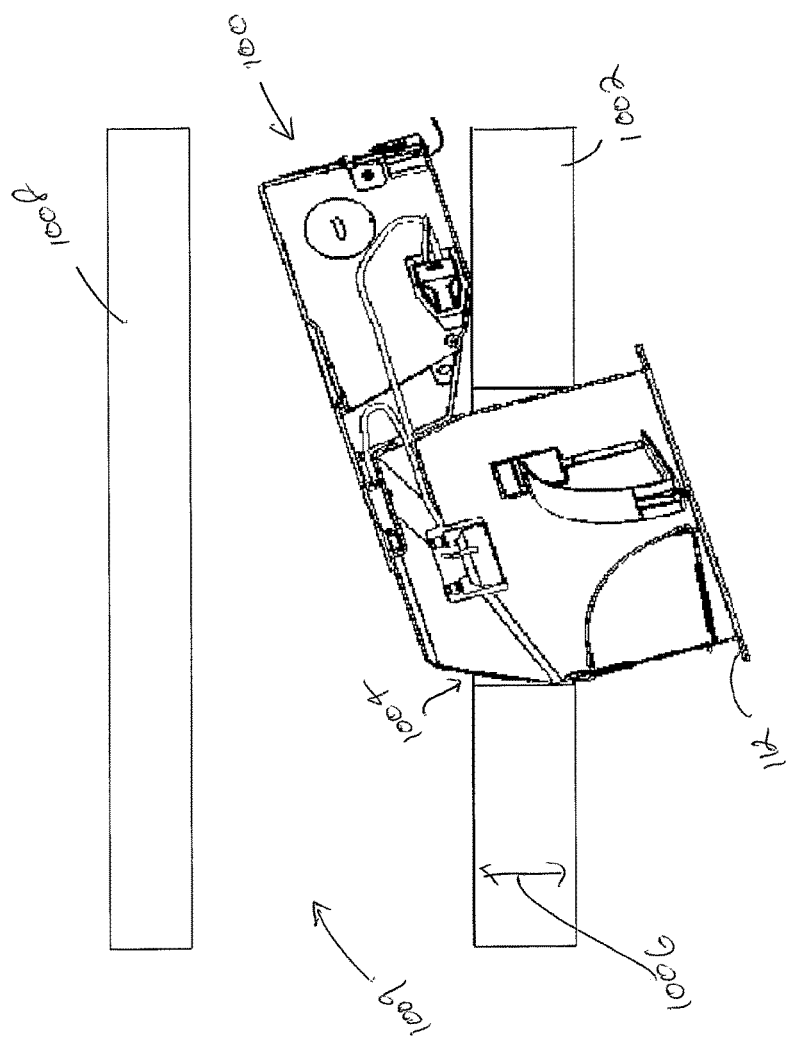
Figure 13:
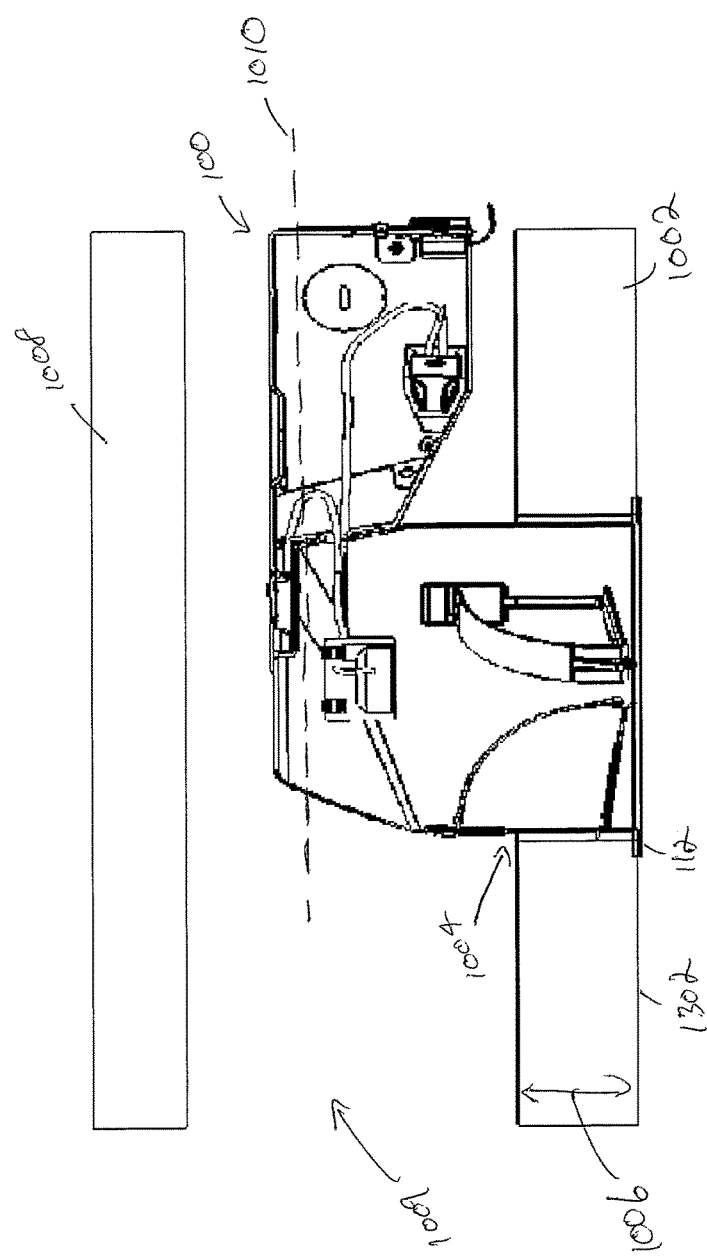
Figure 14:
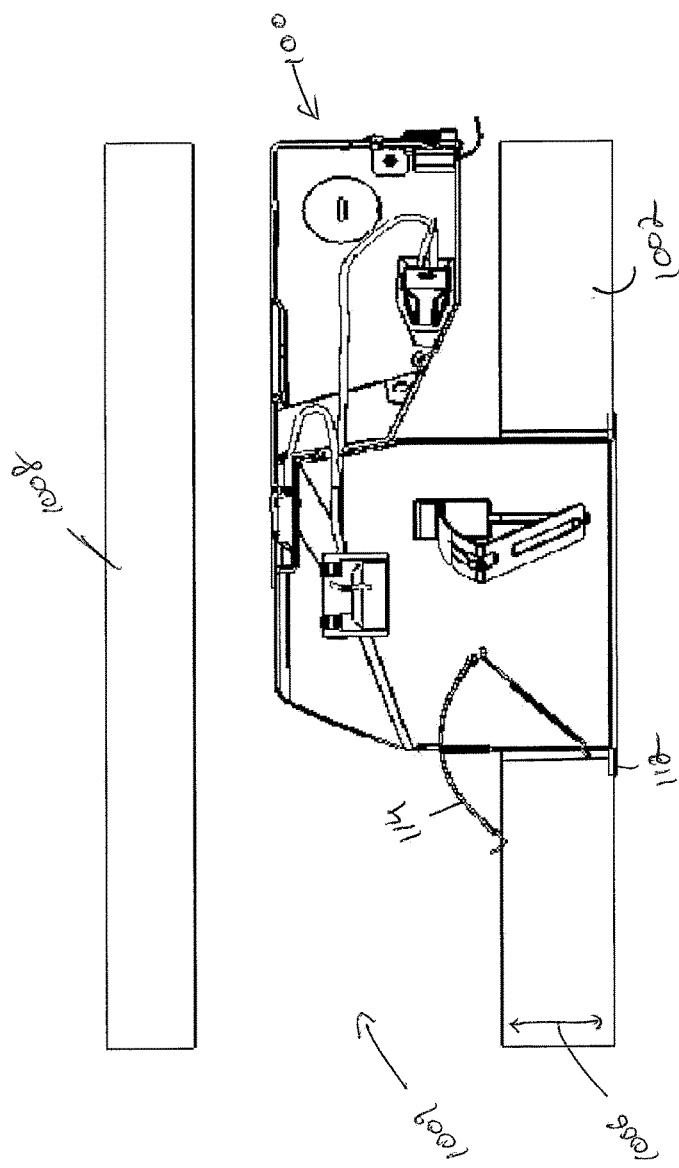

Responsively, the remodel recessed luminaire 100 may be positioned below the ceiling aperture 1004 and vertically oriented such that an axis 1010 passing through the remodel recessed luminaire 100 is substantially perpendicular to the ceiling 1002 (vertically oriented), the axis 1010 being substantially parallel to the trim flange 112, the top wall 108 of the housing can 104, and the first wall 136 of the top cover 116. The vertically oriented remodel recessed luminaire 100 may be pushed up into the plenum space 1009 through the ceiling aperture 1004. Then, as illustrated in FIG. 11, the remodel recessed luminaire may be reoriented or rotated such that: (a) the complementary second slope 203 defined by the junction box 104 pivotally engages the perimeter of the ceiling aperture 1004 at a top surface 1102 of ceiling 1002, and (b) the first slope 201 defined by the sloped wall 110 of the housing can 104 enters the ceiling aperture 1004. Further, as illustrated in FIGS. 12 and 13, the remodel recessed luminaire 100 may be pivoted about the top surface 1102 of the ceiling 1002 and pushed into the plenum space 1009 till: (a) the first slope 201 of the housing can 104 passes through the ceiling aperture 1004 and clears a thickness 1006 of the ceiling 1002, and (b) the remodel recessed luminaire is horizontally oriented, i.e., the axis defined earlier is substantially parallel to the ceiling 1002. Then, the remodel recessed luminaire 100 may be pushed upwards into the plenum space 1009 till the trim flange 112 of the housing can 104 engages the bottom surface 1302 of the ceiling 1002. Responsively, as illustrated in FIG. 14, to retain the remodel recessed luminaire in the ceiling aperture 1004, the retention spring clips 114 may be pushed out such that the ceiling 1002 is clamped between the trim flange 112 and the retention spring clips 114 of the housing can 104.

The first slope of the housing can 104 and the complementary second slope of the junction box 102 operate in concert as illustrated in FIGS. 11 and 12, to allow installation of the remodel recessed luminaire 100 in shallow plenum spaces through small ceiling apertures or apertures in thick ceiling for remodeling applications while allowing the remodel recessed luminaire to maintain a smaller footprint or compact size, i.e., total length, width, and/or height of the remodel recessed luminaire 100. In contrast, some conventional remodel recessed luminaires may attach the junction box to the housing can using a connecting arm or rod that separates the junction box from the housing can by a certain distance. The connecting rod may allow the remodel recessed luminaire to be rotated and/or re-oriented during installation to pass through ceiling apertures, however, the connecting rod may increase a footprint, e.g., length of the remodel recessed luminaire which makes them unsuitable for installation in shallow plenum spaces.

Certain example embodiments provide a number of benefits. Examples of such benefits include, but are not limited to, simplified installation, simplified inspection, simplified maintenance, installation of a luminaires (including the junction boxes) in relatively small spaces, minimized damage to electrical wiring cables, reduced size or footprint of the luminaire, and reduced cost.

Although the present disclosure is described with reference to example embodiments, it should be appreciated by those skilled in the art that various modifications are well within the scope of the present disclosure. From the foregoing, it will be appreciated that an embodiment of the present disclosure overcomes the limitations of the prior art. Those skilled in the art will appreciate that the present disclosure is not limited to any specifically discussed application and that the embodiments described herein are illustrative and not restrictive. From the description of the example embodiments, equivalents of the elements shown therein will suggest themselves to those skilled in the art, and ways of constructing other embodiments of the present disclosure will suggest themselves to practitioners of the art. Therefore, the scope of the present disclosure is not limited herein.

What is claimed is:

1. A remodel recessed luminaire comprising:
a cylindrical housing can comprising a curved side wall and a top wall that define a first inner cavity, the top wall comprising an indentation, the indentation defining a channel that is configured to retain a thermoprotector device therein,
wherein the channel is open along the top wall of the cylindrical housing can and on one side of the channel while a remainder of the channel is bounded by the top wall of the cylindrical housing can; and
a junction box comprising a top cover and a main body, the main body comprising a side wall, the junction box defining a second cavity, the junction box coupled to the top wall of the cylindrical housing can such that:
the top of the channel that is open is covered by the top cover of the junction box, and
the second cavity is in continuous communication with the channel through the one side of the channel that is open to form a wire management cavity that is disposed external to the first inner cavity of the cylindrical housing can, the wire management cavity comprising the channel and the second cavity,
wherein when the thermoprotector device is disposed in the channel, electrical wiring from an external power supply source is connected to the thermoprotector device through the wire management cavity that is external to the first inner cavity of the cylindrical housing can and via an electrical connector disposed in the second cavity defined by the junction box.

2. The remodel recessed luminaire of claim 1:
wherein the top cover of the junction box has a securing tab and a securing rib, the securing tab extending out and away from the top cover at an acute angle, and
wherein the junction box is coupled to the cylindrical housing can such that when the thermoprotector device is disposed in the channel of the cylindrical housing can, the securing tab and the securing rib of the junction box are disposed above the channel such that they engage the thermoprotector device to:
securely retain the thermoprotector device in the channel, and
enhance a thermal contact between the thermoprotector device and the top wall of the cylindrical housing can.

3. The remodel recessed luminaire of claim 2, wherein the top cover includes a mounting pad that is configured to attach an electrical component thereto using a fastener.

4. The remodel recessed luminaire of claim 1, wherein when the top cover is coupled to the main body of the junction box, a portion of the top cover encloses the second cavity while a remainder portion of the top cover overhangs from the main body.

5. The remodel recessed luminaire of claim 4:
wherein the main body comprises a door that is hingedly coupled to the main body and is retained in a closed position using a fastening device to cover a notch defined by a bottom wall of the main body, and
wherein the fastening device is coupled to the top cover.

6. The remodel recessed luminaire of claim 4:
wherein the remainder portion of the top cover comprises a coupling aperture and a coupling tab disposed at and extending from an edge of the top cover,
wherein the coupling tab and the coupling aperture of the top cover are configured to couple the junction box to the cylindrical housing can by engaging corresponding coupling features of the top wall of the cylindrical housing can, and
wherein the coupling features of the top wall of the cylindrical housing can comprise a cover slot that receives the coupling tab of the top cover and a cover aperture that axially aligns with the coupling aperture of the top cover to receive a fastener therethrough.

7. The remodel recessed luminaire of claim 1:
wherein the first inner cavity of the cylindrical housing can houses a light circuit, and
wherein the thermoprotector device may be electrically coupled to the light circuit and in series with the light circuit.

8. The remodel recessed luminaire of claim 1:
wherein the cylindrical housing can comprises a sloped wall that extends from a perimeter of the top wall to the curved side wall of the cylindrical housing can,
wherein the sloped wall is asymmetric such that the sloped wall is wider on a first side of the housing can than on a second side of the cylindrical housing can that is opposite to the first side, and
wherein the widest portion of the sloped wall defines a first slope.

9. The remodel recessed luminaire of claim 8:
wherein the junction box is coupled to the cylindrical housing can adjacent the second side of the cylindrical housing can, and
wherein the junction box defines a complementary second slope disposed at a bottom side of the junction box, and
wherein the first slope defined by the sloped wall of the cylindrical housing can and the second complementary slope defined by the junction box operate in concert to fit the remodel recessed luminaire through a small ceiling aperture or a ceiling aperture of a thick ceiling.

10. The remodel recessed luminaire of claim 9, wherein the thickness of the thick ceiling ranges from 1 inch to 2 inches.

11. The remodel recessed luminaire of claim 1, wherein the junction box is configured to attach an electrical component thereto such that the electrical component is disposed in the second cavity defined by the junction box.

12. The remodel recessed luminaire of claim 11, wherein the electrical component is a transformer.

13. The remodel recessed luminaire of claim 1:
wherein the electrical connector is a terminal block, and
wherein the second cavity is configured to house a connector frame that supports a plurality of electrical connectors including the electrical connector.

14. A remodel recessed luminaire comprising:
a cylindrical housing can that comprises a sloped wall that extends between a top wall and a side wall of the cylindrical housing can, the sloped wall is asymmetric such that the sloped wall is wider on a first side of the cylindrical housing can than on a second side of the cylindrical housing can that is opposite to the first side of the cylindrical housing can, wherein the wider portion of the sloped wall on the first side defines a first slope; and
a junction box that is coupled to the top wall of the cylindrical housing can adjacent the second side of the cylindrical housing can and comprising a main body of the junction box that defines a complementary second slope that is disposed at a bottom side of the junction box, wherein the complementary second slope tapers towards a front wall of the main body,
wherein the junction box is coupled to the cylindrical housing can such that the front wall of the main body is disposed adjacent the second side of the cylindrical housing can and a wire receiving opening formed in the side wall on the second side of the cylindrical housing can is axially aligned with a wire receiving opening in the front wall of the main body, and
wherein the cylindrical housing can and the junction box can be inserted through an aperture in a ceiling.

15. The remodel recessed luminaire of claim 14, wherein the junction box further comprises a top cover that is coupled to the main body such that a portion of the top cover encloses a second cavity defined by the main body while a remainder portion of the top cover overhangs from the main body.

16. The remodel recessed luminaire of claim 15:
wherein the remainder portion of the top cover comprises a coupling aperture and a coupling tab disposed at and extending from an edge of the top cover,
wherein the coupling tab and the coupling aperture of the top cover are configured to couple the junction box to the top wall of the cylindrical housing can by engaging corresponding coupling features of the top wall of the cylindrical housing can, and
wherein the coupling features of the top wall of the cylindrical housing can comprise a cover slot that receives the coupling tab of the top cover and a cover aperture that axially aligns with the coupling aperture of the top cover to receive a fastener therethrough.

17. The remodel recessed luminaire of claim 15:
wherein the top cover of the junction box comprises a mounting pad that is configured to attach an electrical component thereto such that the electrical component is disposed in the second cavity when the top cover is coupled to the main body of the junction box, and
wherein the electrical component is a transformer.

18. The remodel recessed luminaire of claim 14:
wherein the cylindrical housing can defines a first inner cavity and comprises an indentation formed in the top wall of the cylindrical housing can, the indentation defining a channel that is configured to retain a thermoprotector device therein, and
wherein the channel is open on a top and on one side while a remainder of the channel is bounded by the top wall of the cylindrical housing can.

19. The remodel recessed luminaire of claim 18:
wherein the main body of the junction box defines a second cavity and is coupled to the cylindrical housing can using a top cover such that:
the top of the channel that is open is covered by the top cover of the junction box, and
the second cavity is in continuous communication with the channel through the open side of the channel to form a wire management cavity that is external to the first inner cavity of the cylindrical housing can.

20. The remodel recessed luminaire of claim 19, wherein when the thermoprotector device is disposed in the channel, electrical wiring from an external power supply source is connected to the thermoprotector device through the wire management cavity that is external to the first inner cavity of the cylindrical housing can and via an electrical connector disposed in the second cavity defined by the junction box.

\* \* \* \* \*